US009498831B2

(12) United States Patent
Sasaki et al.

(10) Patent No.: US 9,498,831 B2
(45) Date of Patent: Nov. 22, 2016

(54) SLIDE TYPE CIRCULAR SAW

(75) Inventors: Katsuhiko Sasaki, Anjo (JP);
Masahiko Inai, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 808 days.

(21) Appl. No.: 12/723,240

(22) Filed: Mar. 12, 2010

(65) Prior Publication Data

US 2010/0242699 A1    Sep. 30, 2010

(30) Foreign Application Priority Data

Mar. 26, 2009  (JP) ................................. 2009-077151

(51) Int. Cl.
| B27B 5/29 | (2006.01) |
| B23D 47/02 | (2006.01) |
| B23D 45/02 | (2006.01) |
| B27B 27/08 | (2006.01) |

(52) U.S. Cl.
CPC ............ B23D 47/02 (2013.01); B23D 45/024 (2013.01); B27B 5/29 (2013.01); B27B 27/08 (2013.01); *Y10T 83/7693* (2015.04)

(58) Field of Classification Search
CPC ...... B23D 45/04; B23D 45/02; B23D 45/08; B23D 47/02; B27B 5/29; B27B 27/08; Y10T 83/7693; Y10T 83/7697
USPC ............ 83/481–508.3, 469, 471, 472, 471.2; 30/275.4
See application file for complete search history.

(56) References Cited

U.S. PATENT DOCUMENTS

| 2,627,880 | A | * | 2/1953 | Johnson ........................... 83/574 |
| 4,869,142 | A | * | 9/1989 | Sato et al. .................... 83/467.1 |
| 5,241,888 | A | * | 9/1993 | Chen ............................ 83/471.3 |
| 5,421,228 | A | * | 6/1995 | Fukinuki ...................... 83/471.3 |
| 5,768,967 | A | * | 6/1998 | Sasaki et al. ................. 83/471.3 |
| 6,170,373 | B1 | * | 1/2001 | Sasaki et al. ................... 83/485 |
| 6,901,834 | B2 | * | 6/2005 | Chang ........................ 83/486.1 |
| 7,387,056 | B2 | * | 6/2008 | Higuchi ......................... 83/483 |
| 7,905,167 | B2 | * | 3/2011 | Ushiwata et al. .............. 83/581 |

(Continued)

FOREIGN PATENT DOCUMENTS

| CN | 1149518 A | 5/1997 |
| EP | 1 400 297 A2 | 3/2004 |

(Continued)

OTHER PUBLICATIONS

European Search Report issued in Application No. 10 00 2954; Dated Feb. 10, 2012.

(Continued)

*Primary Examiner* — Stephen Choi
*Assistant Examiner* — Fernando Ayala
(74) *Attorney, Agent, or Firm* — Oliff PLC

(57) ABSTRACT

In a slide type circular saw, slide bars extending parallel to each other in a front-rear direction are slidably supported by bearing parts provided in first and second holding portions. The bearing part included in the first holding portion is press-fitted therein, while the bearing part included in the second holding portion is loosely inserted therein, and the second holding portion includes a pressing member which is configured to press the bearing part of the second holding portion against an inner surface of the second holding portion in a direction perpendicular to a plane which contains axes of the slide bars.

11 Claims, 9 Drawing Sheets

(56) References Cited

U.S. PATENT DOCUMENTS

| | | | |
|---|---|---|---|
| 8,061,250 B2 * | 11/2011 | Ushiwata et al. | 83/471.3 |
| 8,499,672 B2 * | 8/2013 | Oberheim | 83/581 |
| 2004/0055436 A1 * | 3/2004 | Parks et al. | 83/471.3 |
| 2004/0165647 A1 * | 8/2004 | Singh et al. | 374/208 |
| 2006/0156888 A1 | 7/2006 | Ushiwata et al. | |
| 2007/0074611 A1 | 4/2007 | Hu | |
| 2008/0210074 A1 * | 9/2008 | Higuchi | 83/471.3 |
| 2010/0104233 A1 * | 4/2010 | Bando et al. | 384/490 |
| 2011/0061487 A1 * | 3/2011 | Tooman et al. | 74/473.36 |

FOREIGN PATENT DOCUMENTS

| | | |
|---|---|---|
| JP | U-59-017319 | 2/1984 |
| JP | U-60-051007 | 4/1985 |
| JP | U-64-052629 | 3/1989 |
| JP | A-06-071603 | 3/1994 |
| JP | Y2-06-007859 | 3/1994 |
| JP | 06297402 A * | 10/1994 |
| JP | A-06-297402 | 10/1994 |
| JP | A-09-001502 | 4/1997 |
| WO | WO 2009/010752 A1 | 1/2009 |

OTHER PUBLICATIONS

Mar. 12, 2013 Office Action issued in Japanese Patent Application No. 2009-077151 (with translation).

Aug. 10, 2011 Chinese Office Action issued in Chinese Patent Application No. 201010112275.6 (with translation).

* cited by examiner

SLIDE TYPE CIRCULAR SAW

BACKGROUND OF THE INVENTION

This application claims the entire benefit of Japanese Patent Application Number 2009-077151 filed on Mar. 26, 2009, the entirety of which is incorporated by reference.

TECHNICAL FIELD

This invention relates to a slide type circular saw in which a saw unit having a saw blade is provided above a base and is configured to be slidable frontward and rearward relative to the base.

BACKGROUND ART

In the slide type circular saw, a saw unit having a motor-driven rotary blade is provided above a base, and configured to be slidable frontward and rearward relative to the base by a slide mechanism, so that even a workpiece having a large dimension in the front-rear direction can be cut through operations of lowering and sliding the saw unit. The slide mechanism, well known in the art as disclosed in Japanese Examined Utility Model Application Publication No. 6-7859, includes an arm stood at the base, a holding member provided at an upper end of the arm, and a pair of guide bars arranged parallel to each other and supported at the holding member in such a manner that the guide bars can slide frontward and rearward. Front ends of the guide bars are coupled to a front holder, and the saw unit is mounted to the front holder in such a manner that the saw unit is rendered pivotally movable upward and downward relative to the front holder. Rear ends of the guide bars are coupled to a rear holder that is provided to prevent undesirable disconnection.

In such a slide mechanism as described above, bearings such as linear ball bearings 52 by which guide bars 51 are slidably supported are provided in a holding member 50, as shown in FIG. 9A. The linear ball bearings 52 are press-fitted in the holding member 50 to ensure a sufficient level of rigidity. Similarly, the coupling of the guide bars 51 to the front holder 53 is also achieved by press fitting. However, any error between an inter-axial pitch P1 of the linear ball bearings 52 press-fitted in the holding member 50 and an inter-axial pitch P2 of the guide bars 51 press-fitted in the front holder 53 would cause guide bars 51 to incline toward each other as shown in FIG. 9B when a saw unit is slid (i.e., the guide bars 51 are slid). This would then make a distance between the rear ends greater or smaller, and thus produce a great resistance against the sliding motion of the guide bars 51. For this reason, at the rear holder 54, the coupling of the guide bars 51 thereto is achieved by loose insertion with much play, so that the inclination of the guide bars 51 is absorbed by this play in the coupling at the rear holder 54.

Such loose insertion of the guide bars 51 in the rear holder 54 allows the guide bars 51 to smoothly slide even if the guide bars 51 incline toward each other, thus serving to invariably provide a good operating feel. On the other hand, however, the loose insertion would disadvantageously produce a wobble and/or twisting, which would possibly lower the rigidity and cutting accuracy.

Thus, there is a need to provide a slide type circular saw capable of ensuring a high degree of rigidity and cutting accuracy while retaining a good operating feel of sliding a saw unit.

The present invention has been made in an attempt to eliminate the above disadvantages, and illustrative, non-limiting embodiments of the present invention may overcome the above disadvantages and other disadvantages not described above.

SUMMARY OF THE INVENTION (1) It is one aspect of the present invention to provide a slide type circular saw which comprises:
  a base;
  a saw unit disposed above the base and configured to be movable upward and downward, the saw unit having a motor-driven saw blade; and
  a slide bar unit which comprises:
    a pair of slide bars extending parallel to each other in a front-rear direction and each having a front end and a rear end,
    a pair of holding portions each including a bearing part by which a corresponding slide bar is slidably supported, and
    a pair of holders comprising a front holder by which the front ends of the slide bars are connected and a rear holder by which the rear ends of the slide bars are connected,
  wherein the saw unit is mounted to one of the front and rear holders with the holding portions being fixed to the base, or the saw unit is mounted to the holding portions with the slide bars being fixed to the base, whereby the saw unit is rendered slidable in the front-rear direction; and
  wherein the holding portions consist of a first holding portion and a second holding portion, the bearing part included in the first holding portion is press-fitted therein, while the bearing part included in the second holding portion is loosely inserted therein, and the second holding portion comprises a pressing member which is configured to press the bearing part of the second holding portion against an inner surface of the second holding portion in a direction perpendicular to a plane which contains axes of the slide bars.

(2) In the above-described configuration (1), the pressing member may comprise a setscrew screwed in the second holding portion to come in contact with an outer surface of the bearing part of the second holding portion.

(3) In the above-described configuration (1), the pressing member may comprise a pair of setscrews which consist of front and rear set screws screwed at front and rear spots, respectively, in the second holding portion to come in contact with an outer surface of the bearing part of the second holding portion.

(4) In the above-described configuration (1), with or without the feature (2), the number of bearing parts may be configured such that the second holding portion includes only one bearing part, and the first holding portion includes two bearing parts arranged in an axial direction of the first holding portion.

(5) In the above-described configuration (1), connection of the slide bars by at least one of the front and rear holders may be established by a structure in which the slide bars are loosely inserted in the at least one of the front and rear holders and fastened therein by screws.

(6) In the above-described configuration (1), connection of the slide bars by at least one of the front and rear holders may be established by a structure in which the slide bars are loosely inserted in the at least one of the front and rear holders and screws screwed in the at least one of the front and rear holders are engaged in grooves formed on peripheral surfaces of the slide bars.

According to the above-described configuration (1), a high degree of rigidity and cutting accuracy can be ensured while a good operating feel of sliding a saw unit can be retained.

With the feature (2) or (3), in addition to the advantages described above in relation to the configuration (1), since the pressing member is implemented as setscrew(s), the pressing member can easily be obtained without impairing the ease of assembly.

With the feature (4), in addition to the advantages described above in relation to the configuration (1) with or without the feature (2), the restrictions on the press-fitted bearing parts and the free play of the loosely inserted bearing part can be well balanced, while the number of bearing parts can be reduced.

With the feature (5), in addition to the advantages described above in relation to the configuration (1), the connection can be established more easily in comparison with the case with press fitting, and thus the ease of assembly can be increased.

With the feature (6), as well, in addition to the advantages described above in relation to the configuration (1), the connection can be established more easily in comparison with the case with press fitting, and thus the ease of assembly can be increased.

BRIEF DESCRIPTION OF THE DRAWINGS

The above aspect, other advantages and further features of the present invention will become more apparent by describing in detail illustrative, non-limiting embodiments thereof with reference to the accompanying drawings, in which.

DESCRIPTION OF EMBODIMENTS

Exemplary embodiments of the present invention will be described hereinafter with reference to the accompanying drawings.

Figure 1:
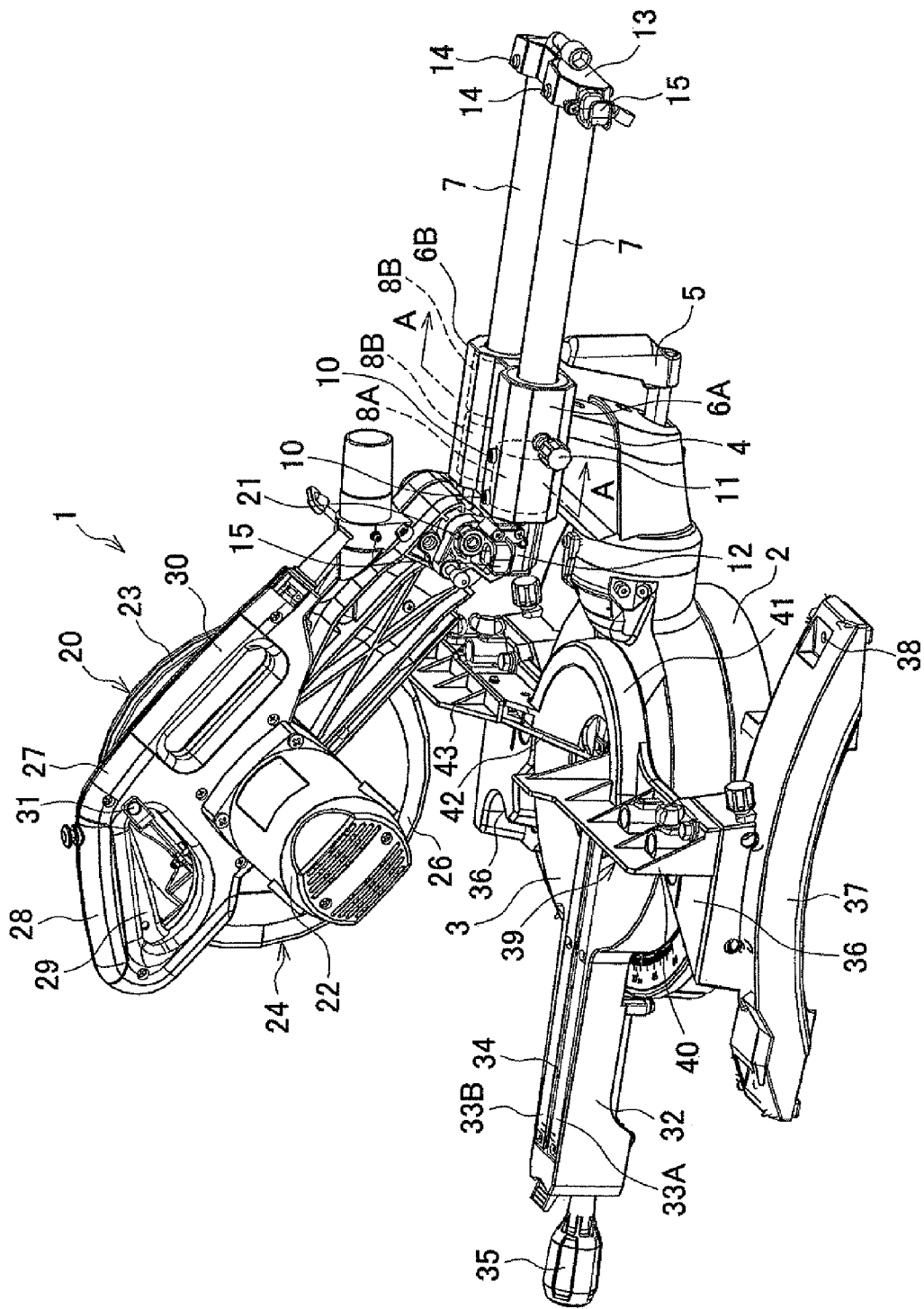
FIG. 1 is a perspective view of a slide type circular saw according to an exemplary embodiment of the present invention, as viewed from a right side thereof.
Figure 2:
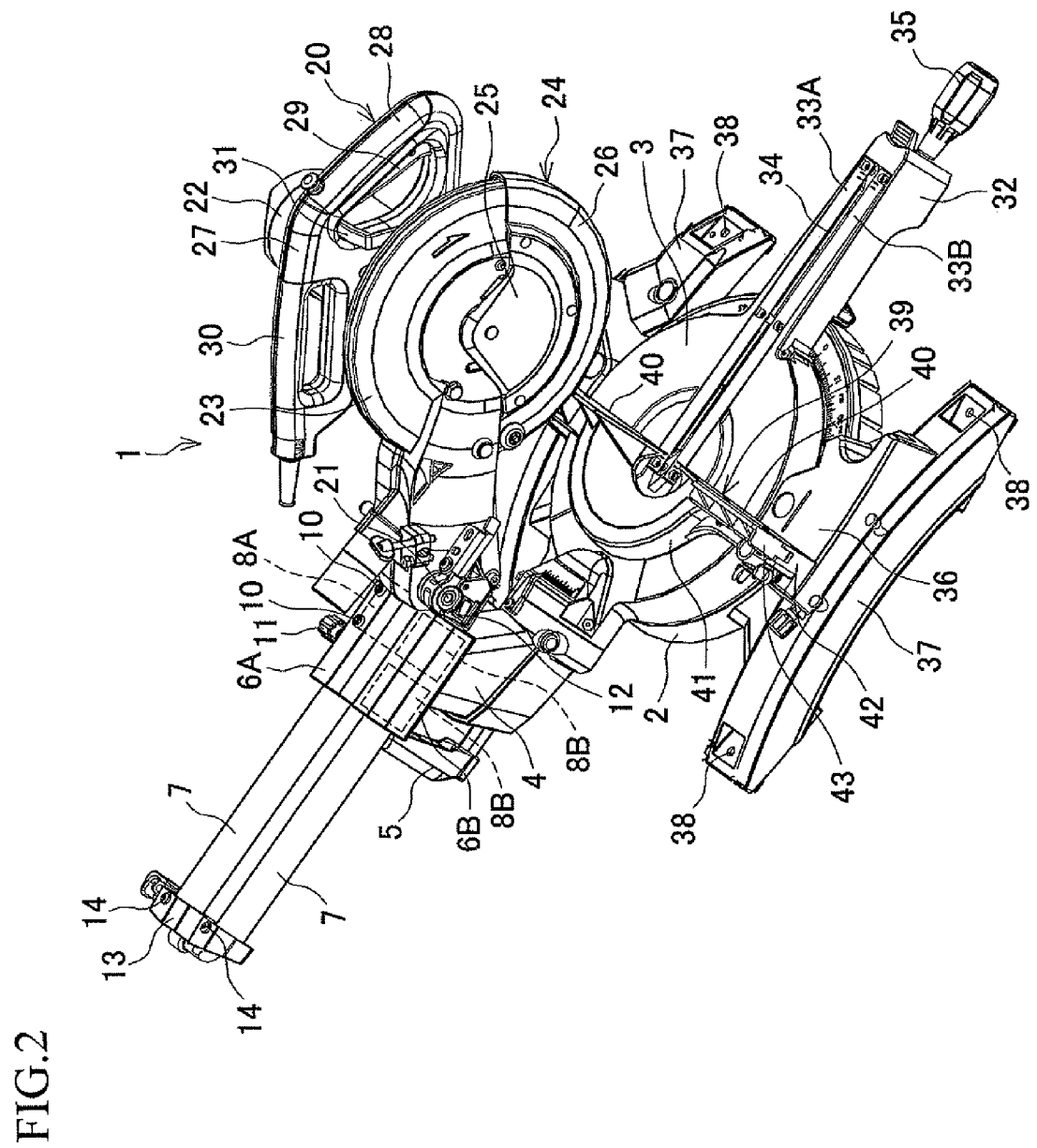
FIG. 2 is a perspective view of the slide type circular saw as viewed from a left side thereof.
Figure 3:
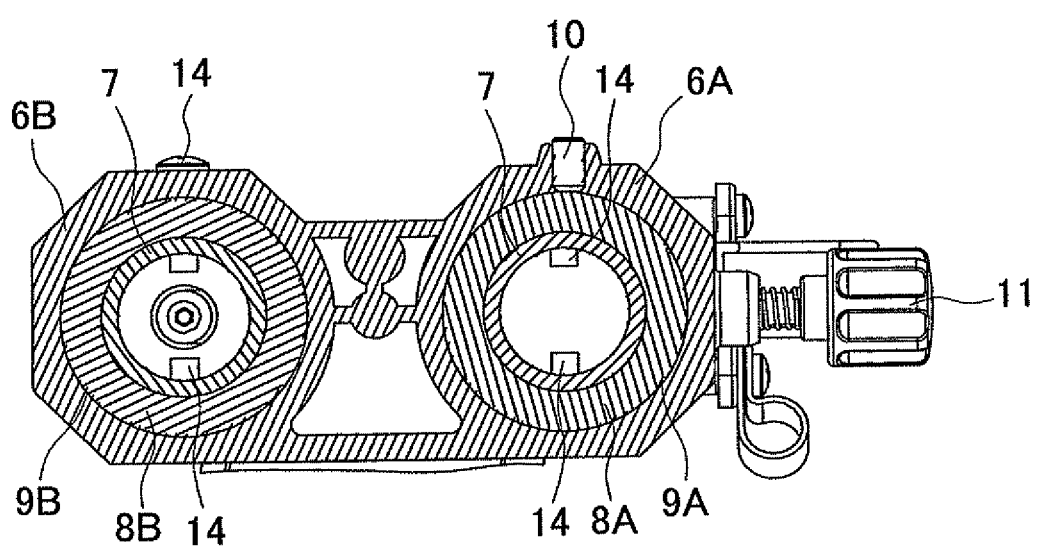
FIG. 3 is a sectional view taken along line A-A of FIG. 1.

Referring now to FIGS. 1 and 2, which are perspective views showing an exemplified embodiment of the present invention, a slide type circular saw 1 includes a base 2 and a saw unit 20, and the base 2 includes a turn base 3 and an arm 4. The turn base 3 is a table circular in shape as viewed from above, which is placed at a center of the base 2 and can be swiveled thereon. The arm 4 has a lever 5 with which the arm 4 can be tilted to the left and to the right up to 45 degrees at the maximum and can be fixed at a desired angle. At an upper end of the arm 4, as also shown in FIG. 3, tubular holding portions 6A, 6B arranged parallel to each other, extending in the front-rear direction, are provided in a pair as an integral part. Left and right pipe-like slide bars 7 are slidably supported by linear ball bearings 8A, 8B, which serve as bearing parts, in such a manner that the slide bars 7 can slide frontward and rearward.

More specifically, one unit of the linear ball bearings 8A is provided in the holding portion 6A at the right side as viewed from the front, while two units of the linear ball bearings 8B are arranged, in the holding portion 6B at the left side as viewed from the front, in an axial direction thereof. The right-side unit of the linear ball bearings 8A is loosely inserted in a through hole 9A of the holding portion 6A, while the left-side units of the linear ball bearings 8B are press-fitted in a through hole 9B of the holding portion 6B, respectively (see FIG. 3). The holding portion 6A includes a pair of front and rear setscrews 10 which are screwed in an upper side thereof and serve as a pressing member. An end of each setscrew 10 protruding inside the holding portion 6A comes in contact with an outer surface of the linear ball bearings 8A, and presses the linear ball bearings 8A against an inner surface of the holding portion 6A (i.e., a lower side of the through hole 9A). In this way, the upward and downward motions of the linear ball bearings 8A are restricted, while only the side play is allowed. Denoted by 11 is a lock screw which is screwed in the holding portion 6A from a right side thereof and configured to be manually screwed in to press the slide bar 7 so that the sliding motion of the slide bar 7 can be locked.

Front end portions of the slide bars 7 are press-fitted in a front holder 12 having a pair of blind holes (not shown), and thus connected to each other. Rear end portions of the slide bars 7 are also connected by a rear holder 13; however, they are not press-fitted, but loosely inserted in blind holes (not shown) formed in the rear holder 13, with screws 14 being screwed through upper and lower sides of the rear holder 13 into the slide bars 7. Denoted by 15 are front and rear cord hooks protrusively provided at right sides of the front holder 12 and the rear holder 13, respectively. The cord hooks 15 are arranged such that a claw of the front cord hook 15 faces to the front while a claw of the rear cord hook 15 faces to the rear. When the slide type circular saw 1 is not in operation, a power cord (connected to the saw unit 20 which will be described below) can be spanned between the cord hooks 15 and held thereon.

The saw unit 20 is provided above the front holder 12 and coupled thereto by a support shaft 21 on which the saw unit 20 is configured to be tiltable upward and downward. The saw unit 20 is retained at the top dead center shown in FIGS. 1 and 2 by a torsion spring (not shown). The saw unit 20 includes a circular saw blade (not shown) that is driven by a motor 22 provided at a right side thereof, and a blade cover 23 with which an upper portion of the saw blade is covered. A safety cover 24 which covers a lower edge of the saw blade when the saw unit 20 is at the top dead center, and is rotated by a linkage (not shown) until the lower edge of the saw blade is uncovered according as the saw unit 20 lowers is provided under the blade cover 23. The safety cover 24 has a two-part structure consisting of a center portion 25 and a peripheral portion 26. The center portion 25 is a fanlike member coupled to a center of the blade cover 23, and the peripheral portion 26 is a member having a U-shaped cross section. The peripheral portion 26 is coupled, and fixed to an outer edge of the center portion 25 with a plurality of screws, and covers the peripheral edge of the saw blade.

Figure 4:
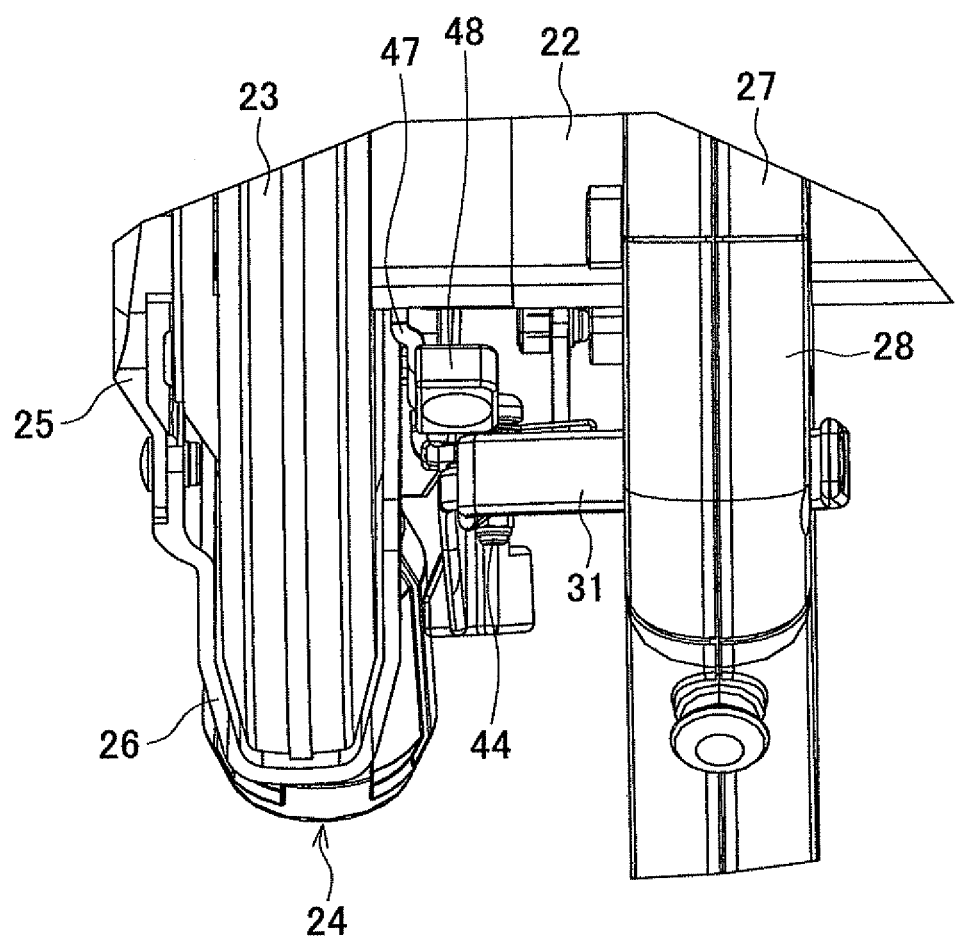
FIG. 4 is a plan view of a portion around a handle.
Figure 5:
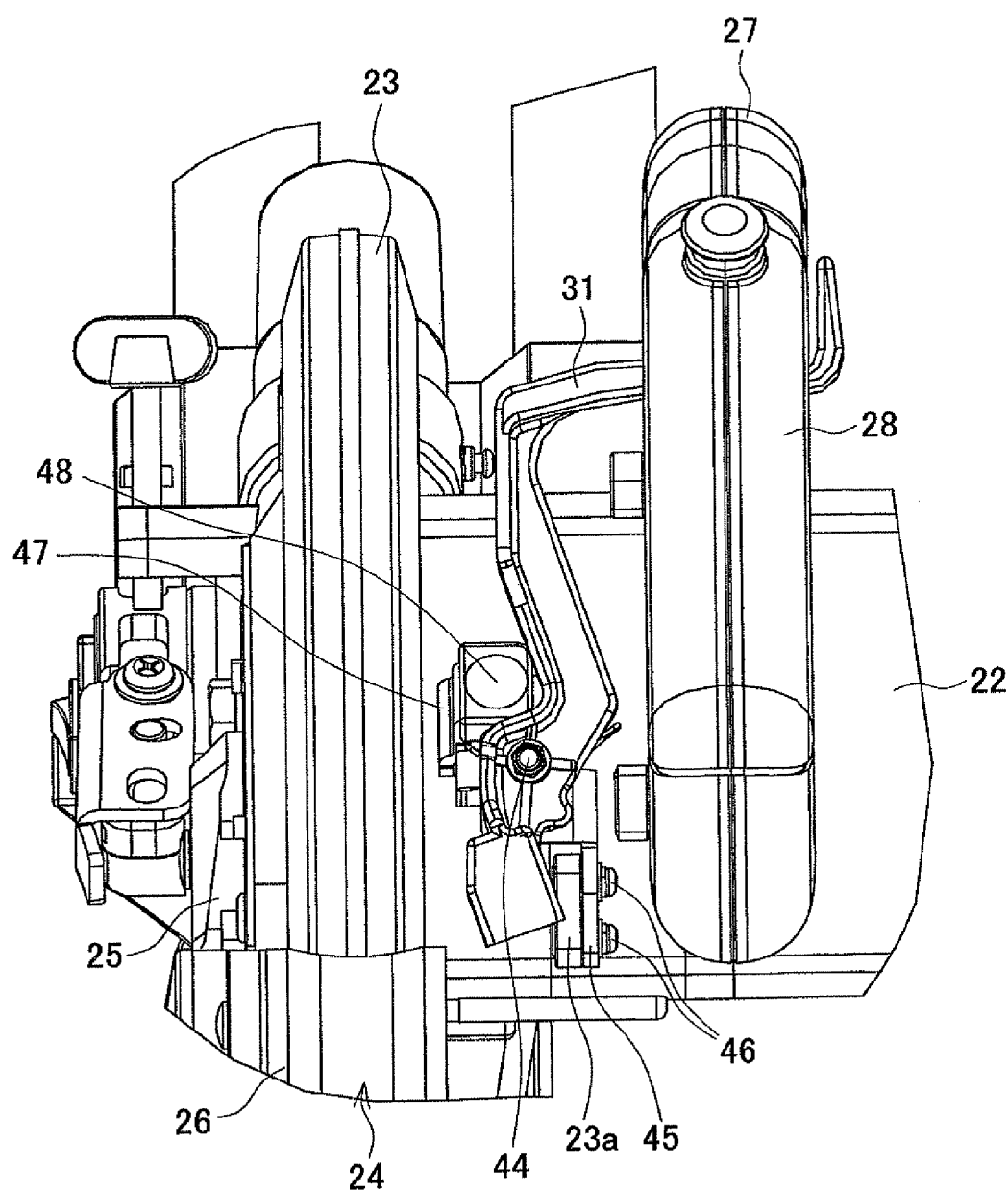
FIG. 5 is a front view of a portion around the handle.

As shown in FIGS. 4 and 5, a handle 27 parallel to the blade cover 23 is provided above the motor 22. A grip portion 28 for operating which has a switch lever 29 is provided frontwardly of the handle 27, and a grip portion 30 for carrying is provided rearwardly of the grip portion 28 for operating.

Denoted by 31 is a lock lever having a lower end portion that is engaged with the safety cover 24 to prevent the safety cover 24 from being rotated when the saw unit 20 is located at the top dead center. The lock lever 31 has another end portion protruding near the grip portion 28. Thus, when the saw unit 20 is lowered, the user's hand which grips the grip portion 28 is allowed to operate the lock lever 31 to release the engagement with the safety cover 24, so that the safety cover 24 is rotated according as the saw unit 20 is lowered. The lock lever 31 is, as best seen in FIG. 5, rotatably secured to a plate 45 with a screw 44, and the plate 45 is fastened to a projection 23a provided on the blade cover 23 with two screws 46. A motor shaft lock plate 47 which can be operated (pushed in) to lock a motor shaft is disposed rearwardly of the lock lever 31. Denoted by 48 is a rubber cap attached to an end portion of the motor shaft lock plate 47.

On the other hand, the base 2 includes a radially extended portion 32 provided frontwardly of the turn base 3, and edge plates 33A, 33B provided on an upper surface of the extended portion 32, extending from the extended portion 32 to the center of the turn base 3. The edge plates 33A, 33B are configured to be slidable to the left and to the right, so that the width of a slit 34 formed therebetween can be adjusted by the sliding operation of the edge plates 33A, 33B. At a front end of the extended portion 32, a grip 35 for horizontal rotation (swiveling operation) of the turn base 3 is provided.

The base 2 further includes bench portions 36 provided at the left and right of the turn base 3. The bench portions 36 has an upper surface having the same height as that of the turn base 3, and legs 37 extending frontward and rearward are provided under the bench portions 36. Denoted by 38 are bolt holes for fixing which are formed at front and rear end portions of each of the legs 37.

Figure 6:
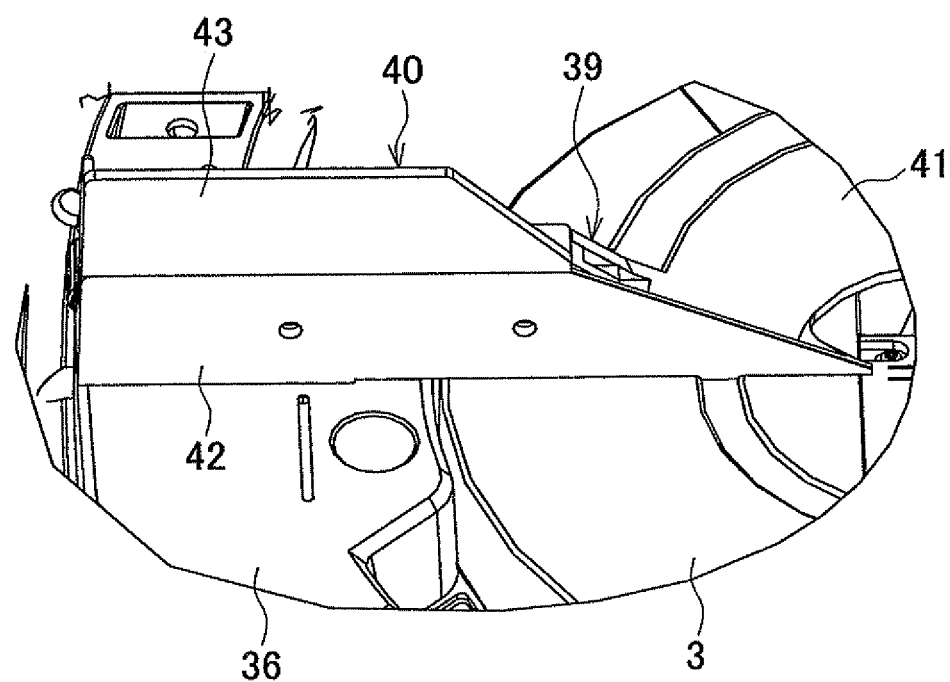
FIG. 6 is a diagram for illustrating a guide fence with an upper plate in a normal position.
Figure 7:
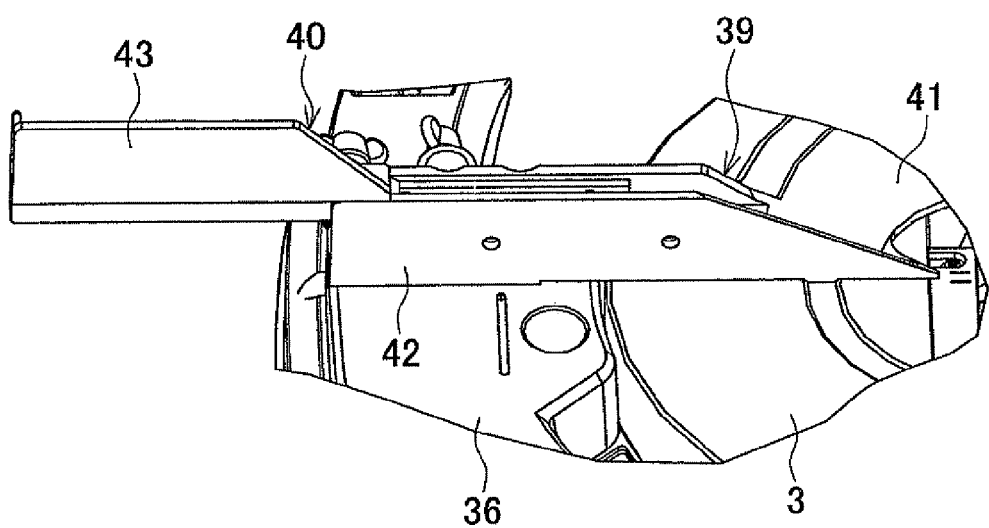
FIG. 7 is a diagram for illustrating the guide fence with the upper plate in a protruded position.

A guide fence 39 is further provided on the upper surfaces of the turn base 3 and the bench portions 36, straddling the left and right benches 36. The guide fence 39 includes a pair of left and right guide portions 40 fixed on the left and right bench portions 36, and a semicircular detouring portion 41 detouring rearwardly round the edge plates 33A, 33B and connecting the left and right guide portions 40. One of the guide portions 40 located at the left side is, as shown in FIGS. 6 and 7, composed of a lower plate 42 and an upper plate 43. The lower plate 42 is fixed on the bench portion 36. The upper plate 43 is disposed on top of the lower plate 42 and configured to be slidable between a normal position where the upper plate 43 is directly above and contiguous to the lower plate 42 and a protruded position where the upper plate 43 is shifted to the left from the normal position.

In operation of the slide type circular saw 1 configured as described above, first, a workpiece to be cut is put on the upper surface of the turn base 3 and pressed against the guide portions 40 of the guide fence 39 so that the workpiece is located in place. In this state, when the grip portion 28 of the handle 27 is grasped and the switch lever 29 is pushed in, the motor 22 start rotating and causes the saw blade to rotate. The saw unit 20 is then lowered, and the safety cover 24 is rotated to uncover the lower edge of the saw blade, so that the saw blade enters the slit 34 between the edge plates 33A and 33B to cut the workpiece at a right angle.

When the turn base 3 is swiveled, the saw unit 20 is turned accordingly, and the angle of the edge plates 33A, 33B and the saw blade is changed with respect to the guide portions 40, so that the workpiece can be cut at an oblique angle as viewed from above; that is, the so-called miter cut can be performed. When the lever 5 is operated and the arm 4 is tilted at a desired angle to the left or to the right, the saw unit 20 is also tilted at that angle, so that the workpiece can be cut at an oblique angle as viewed from the front; that is, the so-called bevel cut can be performed. It is to be understood that the bevel cut tilted to the left can be performed after the upper plate 43 of the left guide portion 40 is slid to the left so that the upper plate 43 could not interfere with the tilted saw unit 20.

On the other hand, when the saw unit 20 is to be slid to cut a workpiece that is long in the front-rear direction, the grip portion 28 of the handle 27 is grasped and the saw unit 20 is pulled to the front. Then, the slide bars 7 coupled integrally by the front holder 12 with the saw unit 20 are slid relative to the holding portions 6A, 6B, and thus the saw unit 20 can be slid to the front. After the saw unit 20 reaches the edge of the workpiece, the switch lever 29 is pushed in and the saw unit 20 is lowered, so that the rotating saw blade enters and cuts the workpiece. The saw unit 20 is then pushed to the rear, and the slide bars 7 are slid to the rear relative to the holding portions 6A, 6B. In this way, the saw unit 20 moves to the rear so that the workpiece can be cut while the saw blade is being slid rearward.

When the slide bars 7 are slid frontward and rearward to allow the saw unit 20 to slid while cutting a workpiece, even if any error exists between the inter-axial pitch of the slide bars 7 press-fitted in the front holder 12 and the inter-axial pitch of the linear ball bearings 8A, 8B of the holding portions 6A, 6B, such an error can be absorbed by a play in the lateral direction provided in the right-side unit of the linear ball bearings 8A loosely inserted in a through hole 9A of the holding portion 6A; therefore, the slide bars 7 can be slid smoothly. Accordingly, a good operating feel of sliding the saw unit 20 can be obtained. Regardless of the play provided as described above, no wobble during the sliding operation would be produced because the setscrews 10 serve to restrict the upward and downward motions of the linear ball bearings 8A.

As described above, with the slide type circular saw 1 implemented according to the present embodiment, the two units of the linear ball bearings 8B included in the holding portion 6B are press-fitted therein while the unit of the linear ball bearings 8A included in the holding portion 6A is loosely inserted therein and the holding portion 6A comprises a pressing member (setscrews 10) which is configured to press the unit of the linear ball bearings 8A against an inner surface of the holding portion 6A in a direction perpendicular to a plane which contains axes of the slide bars 7. Accordingly, a high degree of rigidity and cutting accuracy can be ensured while a good operating feel of sliding the saw unit 20 can be retained.

In particular, since the pressing member in this embodiment is realized by the setscrews 10 screwed in the holding portion 6A to come in contact with an outer surface of the unit of the linear ball bearings 8A, the pressing member can be provided easily without impairing the ease of assembly.

Moreover, since the number of units of the linear ball bearings 8A, 8B is configured, in this embodiment, such that the holding portion 6A includes only one unit and the holding portion 6B includes two units arranged in an axial direction of the holding portion 6B, and the unit of the linear ball bearings 8A is loosely inserted in the holding portion 6A with the setscrews 10 provided therein, the restrictions on the press-fitted units of the linear ball bearings 8B and the free play of the loosely inserted unit of the linear ball bearings 8A can be well balanced, while the number of units of the linear ball bearings can be reduced.

Furthermore, since the connection of the slide bars 7 by the rear holder 13 is established by a structure in which the slide bars 7 are loosely inserted in the rear holder 13 and fastened therein by screws 14, the connection can be established more easily in comparison with the case with press fitting, and thus the ease of assembly can be increased.

Although the slide bars are arranged laterally in the above-described embodiment, the slide bars may be arranged vertically, or in any other direction. For example, in a case where the slide bars are arranged vertically, the pressing member may be configured to press the bearing part in the lateral direction.

The pressing member may not be limited to such means as in the above-described embodiment; a setscrew which is not screwed from above but is screwed from below may be adopted, instead. Any means other than the setscrew such as a spring which directly presses a bearing part, and a pin which is biased by a spring to press a bearing part, may be adopted as an alternative.

Moreover, the above-described embodiment proposes that the connection of the slide bars to the front holder be established by press fitting, but an alternative structure may adopted in which the front end portions of the slide bars are loosely inserted in the front holder and fastened therein by screws. If the slide bars are connected at both of the front end and the rear end by loose insertion of the end portions plus fastening by screws in the holders, the ease of assembly is further improved.

Figure 8A:
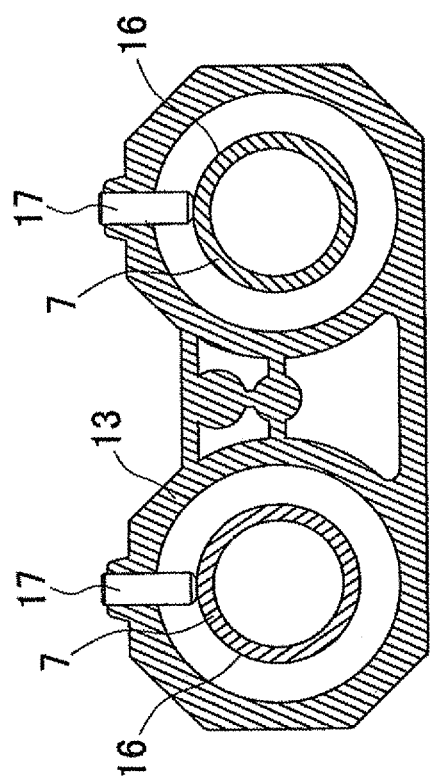
FIGS. 8A and 8B are a cross section and a longitudinal section, respectively, for illustrating a modified example of a coupling structure of slide bars.
Figure 8B:
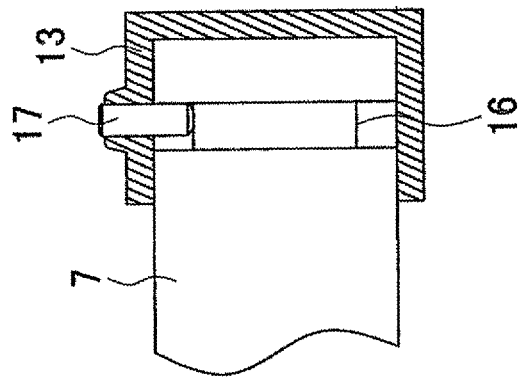
Figure 9A:
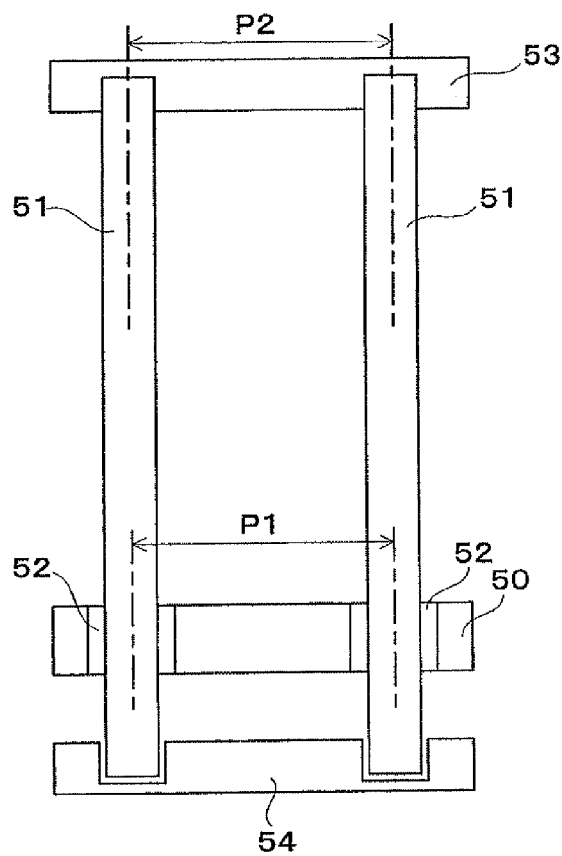
FIG. 9 is a schematic diagram for illustrating a slide mechanism provided in a conventional slide type circular saw.
Figure 9B:
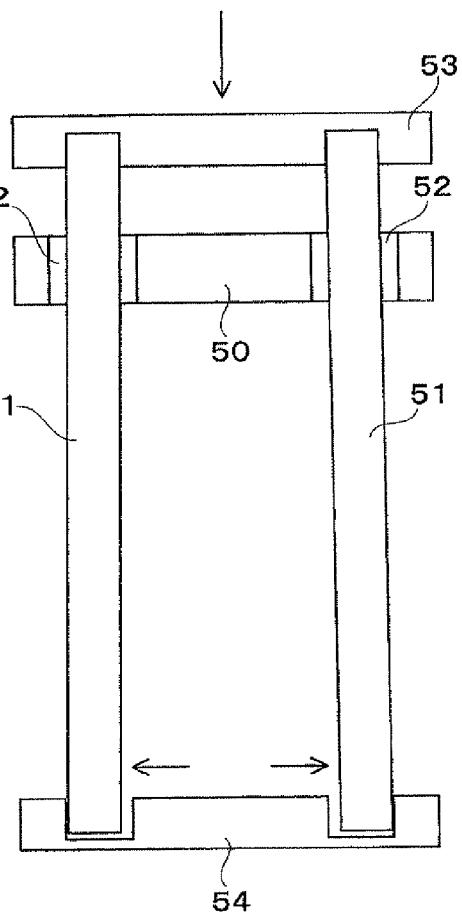

Besides, as shown in FIG. 8, it is also conceivable that the slide bars 7 are loosely inserted in the rear holder 13 and protruded end portions of screws 17 screwed in the rear holder 13 are engaged in grooves 16 formed on peripheral surfaces of the slide bars 7 to prevent the slide bars 7 from slipping out. This configuration may be adopted at the front holder. Screws may be screwed laterally from one side or vertically from below. The number of screws may be increased as desired. The grooves may, but not necessarily, be formed in the entire circumferences of the peripheral surfaces. With these engageable structures, the connection can be established easily and the ease of assembly is further improved.

Furthermore, the configuration that enables sliding motion of the saw unit relative to the base may not be limited to a particular configuration described above. For example, the present invention may be implemented in a configuration such that a saw unit is pivoted on an upper end of an arm of which a lower end is provided with a rear holder by which slide bars are connected, whereas the slide bars are supported by bearing parts of holding portions provided at a rear end of the turn base, and the front end portions of the slide bars are connected by the front holder provided in a lower side of the base. Alternatively, the present invention may be implemented in a configuration such that the slide bars are fixed to the base and the saw unit is mounted to the holding portions slidable along the slide bars.

In any other aspects as well, the present invention may be modified; for example, the saw unit may be configured to be tiltable either to the left or to the right, and a slide type circular saw may be configured without a turn base.

What is claimed is:

1. A slide type circular saw comprising:
    a base;
    a saw unit disposed above the base and configured to be movable upward and downward, the saw unit having a motor-driven rotary saw blade; and
    a slide bar unit, the slide bar unit comprising:
        a first holding portion including a plurality of linear ball bearing parts that are press-fitted in the first holding portion, the plurality of linear ball bearing parts being arranged in an axial direction relative to the first holding portion;
        a second holding portion including: (1) a linear ball bearing part that is loosely inserted in the second holding portion, and (2) a pair of setscrews screwed at front and rear spots in the second holding portion, respectively, the pair of setscrews directly contacting an outer surface of the linear ball bearing part of the second holding portion, (i) the linear ball bearing part of the second holding portion having a cylindrical shape such that an outer surface of the linear ball bearing part has a circular shape when viewed from an axial direction of the linear ball bearing part and the circular shape extends along an entire length of the linear ball bearing part in the axial direction of the linear ball bearing part, a diameter of the circular shape being the same over the entire length of the linear ball bearing part in the axial direction of the linear ball bearing part, and (ii) an inner surface of the second holding portion having a circular shape when viewed from the axial direction of the linear ball bearing part and the circular shape of the inner surface of the second holding portion extends along an entire length of the second holding portion in the axial direction of the linear ball bearing part, a diameter of the circular shape of the inner surface of the second holding portion being the same over the entire length of the second holding portion in the axial direction of the linear ball bearing part;
        a pair of slide bars extending parallel to each other in a front-rear direction and each having a front end and a rear end, the pair of slide bars being slidably supported and surrounded by the linear ball bearing parts of the first holding portion and the second holding portion, respectively; and
        a pair of holders forming a front holder by which the front ends of the slide bars are connected and a rear holder by which the rear ends of the slide bars are connected, wherein:
    (1) the saw unit is mounted to one of the front and rear holders with the holding portions being fixed to the base, or (2) the saw unit is mounted to the holding portions with the slide bars being fixed to the base, whereby the saw unit is rendered slidable in the front-rear direction, and
    the pair of setscrews press the outer surface of the linear ball bearing part of the second holding portion against the inner surface of the second holding portion in a direction perpendicular to a plane which contains axes of the slide bars, such that i) upward and downward motions of the linear ball bearing part of the second holding portion are restricted to prevent wobbling of the slide bars during a sliding operation of the saw unit (ii) while a movement of the linear ball bearing part of the second holding portion in the axial direction of the linear ball bearing part is permitted.

2. The slide type circular saw according to claim 1, wherein connection of the slide bars by at least one of the front and rear holders is established by a structure in which the slide bars are loosely inserted in the at least one of the front and rear holders and fastened therein by screws.

3. The slide type circular saw according to claim 1, wherein connection of the slide bars by at least one of the front and rear holders is established by a structure in which the slide bars are loosely inserted in the at least one of the front and rear holders and screws screwed in the at least one of the front and rear holders are engaged in grooves formed on peripheral surfaces of the slide bars.

4. The slide type circular saw according to claim 2, wherein connection of the slide bars by one of the front and rear holders is established by press fitting.

5. The slide type circular saw according to claim 3, wherein connection of the slide bars by one of the front and rear holders is established by press fitting.

6. The slide type circular saw according to claim 1, wherein each of the slide bars has a shape of a pipe.

7. The slide type circular saw according to claim 1, wherein the linear ball bearing part is formed of a linear ball bearing.

8. The slide type circular saw according to claim 1, further comprising:

a lock screw provided in one of the holding portions, the lock screw being manipulatable to be screwed deep therein to be pressed against the slide bar whereby a sliding motion of the slide bars is locked.

9. The slide type circular saw according to claim 1, further comprising:

cord hooks provided protrusively at sides of the holders, respectively, and configured to hold a power cord spanned therebetween.

10. The slide type circular saw according to claim 1, wherein the saw unit includes a grip portion for operating and a grip portion for carrying.

11. The slide type circular saw according to claim 1, wherein the pair of setscrews press the outer surface of the linear ball bearing part of the second holding portion against the inner surface of the second holding portion in the direction perpendicular to the plane which contains axes of the slide bars, such that a movement of the linear ball bearing part of the second holding portion in a lateral direction that is perpendicular to the both the axial direction of the linear ball bearing part and a vertical direction of the linear ball bearing part is permitted.

* * * * *